(12) United States Patent
Murata et al.

(10) Patent No.: US 8,211,541 B2
(45) Date of Patent: Jul. 3, 2012

(54) MULTILAYER STRUCTURE AND PROCESS FOR PRODUCING THE SAME

(75) Inventors: Tomonori Murata, Kurashiki (JP); Takeyuki Igarashi, Kurashiki (JP); Kaoru Ikeda, Kurashiki (JP); Tomoyuki Watanabe, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1048 days.

(21) Appl. No.: 12/094,020

(22) PCT Filed: Nov. 17, 2005

(86) PCT No.: PCT/JP2005/021140
§ 371 (c)(1),
(2), (4) Date: Nov. 17, 2005

(87) PCT Pub. No.: WO2007/057960
PCT Pub. Date: May 24, 2007

(65) Prior Publication Data
US 2008/0254279 A1    Oct. 16, 2008

(51) Int. Cl.
*B32B 15/02* (2006.01)
*B32B 15/085* (2006.01)
*B32B 37/12* (2006.01)
*B32B 37/14* (2006.01)

(52) U.S. Cl. ............... 428/355 R; 428/323; 428/36.91; 428/36.9; 428/35.7; 428/327; 428/221; 428/343; 264/1.7; 264/241

(58) Field of Classification Search ............. 428/323, 428/36.91, 36.9, 35.7, 327, 221, 343, 355 R; 264/241, 1.7
See application file for complete search history.

(56) References Cited

U.S. PATENT DOCUMENTS

| | | |
|---|---|---|
| 5,571,871 A | 11/1996 | Ikeda et al. |
| 6,242,087 B1 | 6/2001 | Kawai |
| 2004/0220366 A1* | 11/2004 | Ikeda et al. ............ 526/335 |
| 2005/0147778 A1* | 7/2005 | Tai et al. ............ 428/36.91 |
| 2008/0003390 A1 | 1/2008 | Hayashi et al. |
| 2008/0254279 A1 | 10/2008 | Murata et al. |

FOREIGN PATENT DOCUMENTS

| | | |
|---|---|---|
| CN | 1095746 C | 12/2002 |
| JP | 7 329252 | 12/1995 |
| JP | 2002 225202 | 8/2002 |

OTHER PUBLICATIONS

Chinese Office Action issued Jul. 27, 2010, in Patent Application No. 200580052499.X (with English-language translation).
Extended Supplementary European Search Report issued on Jan. 18, 2011 in corresponding European Application No. 05 80 6689.
U.S. Appl. No. 11/813,840, filed Jul. 12, 2007, Isoyama, et al.
U.S. Appl. No. 12/521,587, filed Jun. 29, 2009, Igarashi, et al.
U.S. Appl. No. 12/524,934, filed Jul. 29, 2009, Igarashi, et al.

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

A multilayer structure having a layer of an adhesive resin composition (A) and a layer of another resin (B), wherein the adhesive resin composition (A) includes a thermoplastic resin (a1) containing functional groups of at least one kind selected from the group consisting of a boronic acid group and boron-containing groups capable of being converted into a boronic acid group in the presence of water, and a polyolefin (a2) which does not contain the functional groups, the blending weight ratio (a1/a2) of the thermoplastic resin (a1) to the polyolefin (a2) is 1/99 to 15/85, and particles of the thermoplastic resin (a1) are dispersed with an average particle diameter of 0.1 to 1.2 μm in a matrix of the polyolefin (a2). Consequently, a multilayer structures having satisfactory interlayer adhesion strength can be provided even if the content of the resin having a special functional group in the adhesive resin composition layer is reduced.

12 Claims, No Drawings

MULTILAYER STRUCTURE AND PROCESS FOR PRODUCING THE SAME

TECHNICAL FIELD

The present invention relates to a multilayer structure having a layer of an adhesive resin composition and a layer of another resin, and to a method for producing the same.

BACKGROUND ART

Ethylene-vinyl alcohol copolymers (hereinafter, sometimes abbreviated as EVOH) are excellent in, for example, gas barrier properties, oil resistance and aroma retention properties and therefore have been used in various applications. However, EVOH also has some drawbacks of high moisture permeability and high expense. In order to maintain advantages inherent in EVOH and compensate defects thereof, EVOH is usually used in lamination with a thermoplastic resin, such as polyolefin and polystyrene. However, because the adhesion of EVOH to such a thermoplastic resin is poor, it is necessary to form an adhesive layer between both layers. As such an adhesive, modified polyolefins, such as polyolefins (e.g., polyethylene, polypropylene, and ethylene-vinyl acetate copolymers) modified with maleic anhydride and ethylene-ethyl acrylate-maleic anhydride copolymers are used widely. However, when such an adhesive is used, adhesion may be insufficient, depending on the brand of EVOH. In some cases, the interlayer adhesion strength after coextrusion molding may change with time. On the other hand, since a resin containing functional groups of at least one kind selected from the group consisting of a boronic acid group and boron-containing groups each capable of being converted into a boronic acid group in the presence of water has a very high reactivity with EVOH, it is possible to solve the aforementioned problems by using it as an adhesive.

WO 02/060961, which is also published as EP1369438A, discloses a multilayer structure produced by laminating an EVOH layer and a polyolefin layer via a layer of an adhesive. As the adhesive, a resin composition containing a polyolefin and a styrene-hydrogenated diene block copolymer containing in its side chain at least one functional group selected from the group consisting of a boronic acid group and boron-containing groups each capable of being converted into a boronic acid group in the presence of water is used. It is shown that multilayer structures obtained in such a procedure have satisfactory interlayer adhesion. It is disclosed that the adhesive resin composition used therein can be produced by melt-kneading the styrene-hydrogenated diene block copolymer and the polyolefin using a Banbury mixer, a twin screw extruder, or the like. In Examples of the publication cited above, a multilayer structure is produced by melt-kneading the styrene-hydrogenated diene block copolymer and the polyolefin using a twin screw extruder to obtain an adhesive resin composition, and then feeding the resulting adhesive resin composition, a polyolefin and an EVOH into single screw extruders, respectively, followed by coextrusion molding.

Since a resin containing functional groups of at least one kind selected from the group consisting of a boronic acid group and boron-containing groups each capable of being converted into a boronic acid group in the presence of water is expensive, it is preferable, from the economical point of view, to use it by diluting it with an inexpensive polyolefin as disclosed in the publication cited above. However, the interlayer adhesion is not sufficient in some applications and, therefore, there is a strong demand for obtaining multilayer structures having satisfactory interlayer adhesion strength even if the used amount of the resin having a special functional group is reduced.

DISCLOSURE OF THE INVENTION

Problem to be Solved by the Invention

The present invention was made in order to solve the aforementioned problems. An object of the present invention is to provide a multilayer structures having satisfactory interlayer adhesion strength even if the content of the resin having a special functional group in the adhesive resin composition layer is reduced. Another object is to provide suitable methods for producing such multilayer structures.

Means for Solving the Problem

The aforementioned problems are solved by providing a multilayer structure having a layer of an adhesive resin composition (A) and a layer of another resin (B), wherein the adhesive resin composition (A) comprises a thermoplastic resin (a1) containing functional groups of at least one kind selected from the group consisting of a boronic acid group and boron-containing groups capable of being converted into a boronic acid group in the presence of water, and a polyolefin (a2) which does not contain the functional groups, the blending weight ratio (a1/a2) of the thermoplastic resin (a1) to the polyolefin (a2) is 1/99 to 15/85, and particles of the thermoplastic resin (a1) are dispersed with an average particle diameter of 0.1 to 1.2 μm in a matrix of the polyolefin (a2).

In this embodiment, it is preferable that the melt flow rate (at 190° C. under a load of 2160 g) of the thermoplastic resin (a1) is from 0.7 to 4 g/10 min and also that the melt flow rate (at 190° C. under a load of 2160 g) of the polyolefin (a2) is from 0.1 to 10 g/10 min. It is one preferred embodiment that the resin (B) is an ethylene-vinyl alcohol copolymer (B1). In this embodiment, a layer of the ethylene-vinyl alcohol copolymer (B1) and a layer of a polyolefin (B2) are preferably laminated to each other via the layer of the adhesive resin composition (A).

The aforementioned problems are solved also by providing a method for producing the multilayer structure, the method including providing a coextrusion molding machine equipped with a plurality of extruders, feeding pellets of the thermoplastic resin (a1) and pellets of the polyolefin (a2) to one extruder, feeding pellets of the resin (B) to another extruder, and performing coextrusion molding. In this embodiment, the pellets of the thermoplastic resin (a1) and the pellets of the polyolefin (a2) are preferably dry blended in advance, and then fed to the extruder. The extruder to which the pellets of the thermoplastic resin (a1) and the pellets of the polyolefin (a2) are fed is also preferably a single screw extruder. The linear velocity of a screw periphery in the single screw extruder is more preferably from 0.8 to 8 m/min.

Effect of the Invention

Multilayer structures of the present invention have satisfactory interlayer adhesion strength even at a reduced content of the resin having a special functional group in the adhesive resin composition layer. As a result, it is possible to provide multilayer structures having satisfactory interlayer adhesion at low costs. By the use of production methods of the present invention, it is possible to obtain such multilayer structures easily.

BEST MODE FOR CARRYING OUT THE INVENTION

The adhesive resin composition (A) used in the multilayer structures of the present invention is a composition having a thermoplastic resin (a1) containing functional groups of at least one kind selected from the group consisting of a boronic acid group and boron-containing groups capable of being converted into a boronic acid group in the presence of water, which are hereinafter occasionally referred to as boron-containing functional groups, and a polyolefin (a2) which does not contain the functional groups.

First, the thermoplastic resin (a1) is described. The thermoplastic resin (a1) is characterized by containing functional groups of at least one kind selected from the group consisting of a boronic acid group and boron-containing groups capable of being converted into a boronic acid group in the presence of water. Among the boron-containing functional groups, the boronic acid group is a group represented by the following formula (I).

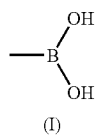

[Chem. 1]

(I)

The boron-containing group capable of being converted into a boronic acid group in the presence of water indicates a boron-containing group that can be hydrolyzed in the presence of water to be converted into a boronic acid group represented by the above formula (I). More specifically, the above boron-containing group means a functional group capable of being converted into a boronic acid group when being hydrolyzed under conditions of from room temperature to 150° C. for from 10 minutes to 2 hours by use, as a solvent, of water only, a mixture of water and an organic solvent (e.g., toluene, xylene and acetone), a mixture of a 5% aqueous boric acid solution and the above described organic solvent, or the like. Representative examples of such functional groups include boronic ester groups represented by the following general formula (II), boronic anhydride groups represented by the following general formula (III), and boronic acid salt groups represented by the following general formula (IV):

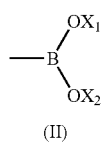

[Chem. 2]

(II)

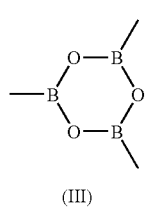

[Chem. 3]

(III)

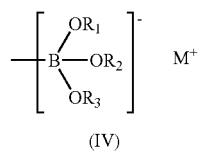

[Chem. 4]

(IV)

wherein $X_1$ and $X_2$ are the same or different and each represent a hydrogen atom, an aliphatic hydrocarbon group (e.g., a linear or branched alkyl or alkenyl group having from 1 to 20 carbon atoms), an alicyclic hydrocarbon group (e.g., a cycloalkyl group and a cycloalkenyl group), or an aromatic hydrocarbon group (e.g., phenyl group and biphenyl group), where the aliphatic hydrocarbon group, the alicyclic hydrocarbon group and the aromatic hydrocarbon group may have a substituent, $X_1$ and $X_2$ may be combined together, provided that in no cases both $X_1$ and $X_2$ are hydrogen atoms; $R_1$, $R_2$ and $R_3$ each represent a hydrogen atom, an aliphatic hydrocarbon group, an alicyclic hydrocarbon group or an aromatic hydrocarbon group like $X_1$ and $X_2$ mentioned above, and M represents alkali metal.

Specific examples of the boronic ester group represented by general formula (II) include dimethyl boronate group, diethyl boronate group, dipropyl boronate group, diisopropyl boronate group, dibutyl boronate group, dihexyl boronate group, dicyclohexyl boronate group, ethylene glycol boronate group, propylene glycol boronate group, 1,3-propanediol boronate group, 1,3-butanediol boronate group, neopentyl glycol boronate group, catechol boronate group, glycerin boronate group, trimethylolethane boronate group, trimethylolpropane boronate group, diethanolamine boronate group, and the like.

The boronic acid salt groups represented by the general formula (IV) may be alkali metal boronate groups, etc. Specific examples include sodium boronate group, potassium boronate group, and the like.

Among such boron-containing functional groups, cyclic boronate ester groups are preferred in view of thermal stability. Examples of the cyclic boronate ester groups include 5-membered or 6-membered ring-containing cyclic boronate ester groups. Specific examples include ethylene glycol boronate group, propylene glycol boronate group, 1,3-propanediol boronate group, 1,3-butanediol boronate group, glycerin boronate group, and the like.

The thermoplastic resin (a1) may contain only one kind of or two or more kinds of boron-containing functional groups. The amount of the boron-containing functional groups is preferably from 0.0001 to 0.002 equivalents per gram of the thermoplastic resin (a1), namely from 100 to 2000 µeq/g, and more preferably from 150 to 1500 µeq/g. When the amount of the functional groups is less than 100 µeq/g, the interlayer adhesion strength of the resulting multilayer structure may deteriorate. When the amount of the functional groups exceeds 2000 µeq/g, gellation easily occurs and the appearance of the resulting multilayer structure may deteriorate.

Although the bonding form of the boron-containing functional groups contained in the thermoplastic resin (a1) of the present invention is not particularly restricted, the boron-containing functional groups are preferably contained as side chains of the polymer. It is easy to obtain a large content of boron-containing functional groups when they are contained as side chains.

When the boron-containing functional groups are bonded only to terminals of a polymer, the amount of the functional groups becomes relatively low particularly in a polymer of high molecular weight, and the reactivity of the thermoplastic resin (a1) may become insufficient. The boron-containing functional groups may be contained at side chains and terminals.

Specific examples of the thermoplastic resin (a1) include polyolefins such as polyethylene (very low density, low density, middle density, high density), ethylene-vinyl acetate copolymers, ethylene-acrylic ester copolymers, polypropylene, ethylene-propylene copolymers and copolymers of ethylene with an α-olefin such as 1-butene, isobutene, 3-methylpentene, 1-hexene and 1-octene; products resulting from graft modification of the aforementioned polyolefins with maleic anhydride, glycidyl methacrylate and the like; styrene resins such as polystyrene and styrene-acrylonitrile copolymers; styrene-diene block copolymers such as styrene-butadiene block copolymers, styrene-isoprene copolymers, styrene-butadiene-styrene block copolymers and styrene-isoprene-styrene block copolymers; styrene-hydrogenated diene block copolymers such as styrene-hydrogenated butadiene block copolymers, styrene-hydrogenated isoprene copolymers, styrene-hydrogenated butadiene-styrene block copolymers and styrene-hydrogenated isoprene-styrene block copolymers; (meth) acrylic ester resins such as poly (methyl acrylate), poly (ethyl acrylate) and poly (methyl methacrylate); vinyl halide-based resins such as poly (vinyl chloride) and vinylidene fluoride; semiaromatic polyesters such as poly (ethylene terephthalate) and poly (butylene terephthalate); and aliphatic polyesters such as polyvalerolactone, polycaprolactone, poly (ethylene succinate) and poly (butylene succinate). These may be used singly or in combination of two or more kinds. Among these, polyolefins and styrene-hydrogenated diene block copolymers are preferable, and styrene-hydrogenated diene block copolymers are particularly preferable.

When the thermoplastic resin (a1) is a styrene-hydrogenated diene block copolymer, the weight ratio of styrene units to hydrogenated diene units contained in the copolymer resin is preferably from 5/95 to 70/30, and more preferably from 10/90 to 50/50. When the weight ratio is within such ranges, the compatibility of the thermoplastic resin (a1) with the polyolefin (a2) becomes suitable, and the average particle diameter of the thermoplastic resin (a1) easily falls into a preferred range. When a high interlayer adhesion strength is particularly desired, a smaller content of styrene units is preferred. Specifically, the weight ratio of styrene units to hydrogenation diene units is preferably 30/70 or less.

The melt flow rate (at 190° C., under a load of 2160 g) of the thermoplastic resin (a1) is preferably from 0.7 to 4 g/10 min. When the melt flow rate is included in this range, the average particle diameter of the thermoplastic resin (a1) dispersing in the adhesive resin composition (A) easily falls into a preferred range. The melt flow rate is more preferably 1 g/10 min or more, and even more preferably 1.5 g/10 min or more. The melt flow rate is more preferably 3 g/10 min or less, and even more preferably 2.5 g/10 min or less.

Next, a representative method for producing the thermoplastic resin (a1) containing a boron-containing functional group for use in the present invention is described.

First method: the thermoplastic resin (a1) containing boron-containing functional groups is obtained by causing a boran complex and a trialkyl borate to react with a thermoplastic resin having an olefinic double bond under a nitrogen atmosphere to produce a thermoplastic resin containing a dialkyl boronate group and then, if necessary, causing water or alcohols to react. In this way, a boron-containing functional group is introduced to the olefinic double bond of the thermoplastic resin by addition reaction.

An olefinic double bond is introduced, for example, to an end by disproportionation occurring at the time of termination of radical polymerization or into a main chain or a side chain by a side reaction occurring during polymerization. In particular, the aforementioned polyolefin is preferred because it is possible to introduce the olefinic double bond thereto easily by thermal decomposition under oxygen-free conditions or copolymerization of diene compounds. Styrene-hydrogenated diene block copolymers are preferred because it is possible to cause an olefinic double bond to remain moderately by controlling a hydrogenation reaction.

The content of double bonds in the thermoplastic resin used as a raw material is preferably from 100 to 2000 µeq/g, and more preferably from 200 to 1000 µeq/g. The use of such a raw material makes it easy to control the amount of boron-containing functional groups introduced thereto. It will also become possible at the same time to control the amount of olefinic double bonds remaining after the introduction of functional groups.

Preferred examples of the borane complex include borane-tetrahydrofuran complex, borane-dimethylsulfide complex, borane-pyridine complex, borane-trimethylamine complex, borane-triethylamine complex, and the like. Among these, borane-dimethylsulfide complex, borane-trimethylamine complex and borane-triethylamine complex are more preferable. The amount of the borane complex to be supplied is preferably within the range of from 1/3 equivalents to 10 equivalents to the olefinic double bonds of the thermoplastic resin.

Preferred examples of the trialkyl borates include lower alkyl esters of boric acid such as trimethyl borate, triethyl borate, tripropyl borate and tributyl borate. The amount of the trialkyl borate to be supplied is preferably within the range of from 1 to 100 equivalents to the olefinic double bonds of the thermoplastic resin. There is no need to use a solvent, but when use it, a saturated hydrocarbon solvent, such as hexane, heptane, octane, decane, dodecane, cyclohexane, ethylcyclohexane and decalin, is preferred. The reaction temperature is typically within the range of from room temperature to 300° C., and preferably from 100 to 250° C. It is recommended to carry out a reaction at a temperature within such ranges for 1 minute to 10 hours, preferably for 5 minutes to 5 hours.

The dialkyl boronate group introduced to a thermoplastic resin through the above described reaction can be hydrolyzed to form a boronic acid group by a known method. It is also allowed to undergo transesterification with an alcohol by a known method to form a boronate group. Further, it can be allowed to undergo dehydration condensation by heating to form a boronic anhydride group. Furthermore, it can be allowed to react with a metal hydroxide or a metal alcoholate to form a boronic acid salt group.

Such conversion of a boron-containing functional group is typically carried out using an organic solvent such as toluene, xylene, acetone and ethyl acetate. Examples of the alcohols include monoalcohols such as methanol, ethanol and butanol; and polyhydric alcohols such as ethylene glycol, propylene glycol, 1,3-propanediol, 1,3-butanediol, neopentyl glycol, glycerin, trimethylolmethane, pentaerythritol and dipentaerythritol. Examples of the metal hydroxide include hydroxides of alkali metals such as sodium and potassium. Examples of the metal alcoholate include those made of the above described metals and the above described alcohols. These are not limited to those listed as examples. The amounts of these reagents to be used are typically from 1 to 100 equivalents to the dialkyl boronate groups.

Second method: the thermoplastic resin (a1) containing boron-containing functional groups is obtained by performing an amidation reaction of a known thermoplastic resin containing a carboxyl group and an amino group-containing boronic acid or an amino group-containing boronic acid ester such as m-aminophenylbenzene boronic acid and m-aminophenylboronic acid ethylene glycol ester using a known method. In this method, a condensing agent such as carbodiimide may be employed. The boron-containing functional group introduced into the thermoplastic resin in such a way can be converted into another boron-containing functional group by the method described above.

Examples of the thermoplastic resin containing a carboxyl group include, but are not restricted to, resins having a carboxyl group on their ends, such as semiaromatic polyester and aliphatic polyester; resins resulting from introduction of monomer units having a carboxyl group such as acrylic acid, methacrylic acid and maleic anhydride to polyolefin, styrene-based resin, (meth)acrylic acid ester-based resin, vinyl halide-based resin, or the like, by copolymerization; and resins resulting from introduction of maleic anhydride, or the like, into the aforementioned thermoplastic resin containing an olefinic double bond by an addition reaction.

The polyolefin (a2) which constitutes the adhesive resin composition (A) is a polyolefin which does not contain the boron-containing functional groups. Specific examples thereof include polyethylene (very low density, low density, middle density, high density), ethylene-vinyl acetate copolymers, polypropylene and ethylene-propylene copolymers. It is also permitted to use products resulting from graft modification of polyolefins with maleic anhydride, glycidyl methacrylate, or the like. Among these, it is preferable to use an ethylene-based resin. Particularly from the interlayer adhesion point of view, an ethylene resins having a low crystallization rate is suitably used. Preferable examples of the ethylene-based resin having a low crystallization rate include polyethylene having a density of from 0.912 to 0.935 g/cm$^3$. The density is more preferably 0.930 g/cm$^3$ or less. Examples of such polyethylene include very low density polyethylene and low density polyethylene (including LLDPE). It is also permitted to adjust the density to that shown above by mixing plural kinds of polyethylene. Other preferable examples of the ethylene-based resin having a low crystallization rate include ethylene-vinyl acetate copolymers, the density of which is preferably from 0.94 to 0.98 g/cm$^3$, and more preferably 0.96 g/cm$^3$ or less. A mixture with scraps of the multilayer structure of the present invention may be used as the polyolefin (a2) unless the object of the present invention is affected.

The melt flow rate (at 190° C., under a load of 2160 g) of the polyolefin (a2) is preferably from 0.1 to 10 g/10 min. When the melt flow rate is included in this range, it is easy to perform coextrusion molding and the average particle diameter of the thermoplastic resin (a1) dispersing in the adhesive resin composition (A) easily falls into a preferred range. The melt flow rate is more preferably 0.5 g/10 min or more, and even more preferably 1 g/10 min or more. The melt flow rate is more preferably 5 g/10 min or less.

The adhesive resin composition (A) includes the thermoplastic resin (a1) and the polyolefin (a2). The blending weight ratio (a1/a2) of the thermoplastic resin (a1) to the polyolefin (a2) is from 1/99 to 15/85. The adhesive resin composition (A) used in the present invention can obtain satisfactory interlayer adhesion by only incorporating a relatively small amount of the thermoplastic resin (a1). A blending weight ratio (a1/a2) of less than 1/99 will result in an insufficient interlayer adhesion. The blending weight ratio (a1/a2) is preferably 1.5/98.5 or more, and more preferably 1.75/98.25 or more. On the other hand, a blending weight ratio (a1/a2) of greater than 15/85 will lead to deterioration of moldability and increase in production cost. The blending weight ratio (a1/a2) is preferably 10/90 or less, and more preferably 5/95 or less.

To the adhesive resin composition (A), antioxidants, plasticizers, heat stabilizers, UV absorbers, antistatic agents, lubricants, colorants, fillers or other resins may be added, unless the effect of the present invention is inhibited.

The adhesive resin composition (A) includes the thermoplastic resin (a1) and the polyolefin (a2), and it can be obtained by melt-kneading both the materials. Although the method of melt-kneading the thermoplastic resin (a1) and the polyolefin (a2) is not particularly restricted, it is important to perform the melt-kneading under conditions such that particles of the thermoplastic resin (a1) could be dispersed at specific particle diameters in the matrix of the polyolefin resin (a2). With such a specific average particle diameter, a multilayer structure having excellent inter interlayer adhesion strength can be obtained, as described in detail infra.

When a resin composition is produced by mixing a plurality of raw material resins, it is generally taught that the raw material resins are preferably mixed fully uniformly. Therefore, in most cases, mixing is conducted by using a mixing apparatus having a high mixing ability, such as a twin-screw extruder, so that particle diameters as small as possible could be achieved. Surprisingly, however, it has become clear that in the adhesive resin composition (A) used in the present invention, the interlayer adhesion strength will rather decrease when the dispersed particle diameter becomes excessively small. Although the reason for this is not necessarily clear, it may be that the amount of boron-containing functional groups which exist in the interface between the layer of the adhesive resin composition (A) and the layer of the other resin (B) varies depending upon the dispersed particle diameter. When the dispersed particle diameter is excessively large, unevenness occurs easily in the layer of the adhesive resin composition (A) and, therefore, the interlayer adhesion strength decreases also in such a case. In sum, it is very important to adjust the particle diameter of the thermoplastic resin (a1) in the layer of the adhesive resin composition (A) into a specific range in order to obtain satisfactory interlayer adhesion strength.

Therefore, a method in which pellets of the adhesive resin composition (A) are prepared by melt-kneading the thermoplastic resin (a1) and the polyolefin (a2), and then the resulting pellets are fed into a molding machine and a multilayer structure is molded is unpreferable because kneading is performed to an excessive degree unexpectedly in many cases. It is preferred, from the interlayer adhesion point of view, to melt-knead a thermoplastic resin (a1) and polyolefin (a2) only once in the production of a multilayer structure. This is preferred also from the production cost point of view. Omission of one melt-kneading operation reduces the production cost of a multilayer structure. The thermoplastic resin (a1) has highly-reactive boron-containing functional groups. Such functional groups, however, do not necessarily have good melt stability and may cause crosslinking or decomposition of a resin. As a result, a resulting multilayer structure may come to have problems such as decrease in interlayer adhesion strength, generation of appearance defects, e.g., coloring, fish eyes and longitudinal streaks, and generation of odor caused by decomposition gas.

The method for molding the multilayer structure is not particularly restricted. For example, a method which includes coextruding the adhesive resin composition (A) and the other resin (B) or a known method such as coinjection molding, extrusion coating, dry lamination and solution coating is adopted. Among such methods, coextrusion molding and coinjection molding are preferred. Coextrusion molding is particularly preferred. When coextrusion is adopted, the melt-extruded components for individual layers may be allowed to contact with each other within a die to laminate (in-die lamination) or may be allowed to contact with each other outside of a die to laminate (out-die lamination). If the contact is performed under pressure, the adhesion between individual layers of the multilayer structure can be improved. The pressure preferably ranges from 1 to 500 Kg/cm$^2$. In the following, description is made by taking coextrusion molding as an example. However, it can be applied also to a case of coinjection molding instead of coextrusion molding.

In a case of coextrusion molding, a method which includes providing a coextrusion molding machine equipped with a plurality of extruders, feeding pellets of the thermoplastic resin (a1) and pellets of the polyolefin (a2) to one extruder, feeding pellets of the resin (B) to another extruder, and performing coextrusion molding is preferable. In this embodiment, it is preferable that the pellets of the thermoplastic resin (a1) and the pellets of the polyolefin (a2) be dry blended in advance, and then fed to one extruder in a coextrusion molding machine. Although the method of the dry blending is not particularly restricted, it is preferable to fully mix pellets of the thermoplastic resin (a1) and pellets of the polyolefin (a2) mechanically in order to dry blend them uniformly. Specific examples of a preferable method include a method that uses a feeder which continuously weighs and mixes the pellets of the thermoplastic resin (a1) and the pellets of the polyolefin (a2) and then feed them to an extruder continuously, and a method in which the pellets of the thermoplastic resin (a1) and the pellets of the polyolefin (a2) are mixed by the use of a tumbler or the like and then fed to an extruder.

In order to prevent excessive kneading, the extruder to which the pellets of the thermoplastic resin (a1) and the pellets of the polyolefin (a2) are fed is preferably a single screw extruder. It is preferable to melt-knead them only once in a single screw extruder and then directly obtain a molded article. Although the constitution of the single screw extruder used here is not particularly limited, the L/D thereof is usually from 5 to 50, and preferably from 10 to 50. It is preferable to adjust the melt-kneading temperature to a temperature such that the resins are not degraded and their melt viscosities drop moderately. It is preferably from 180 to 280° C., and more preferably from 200 to 250° C. An excessively short residence time in the extruder may result in failure to obtain a uniform composition, whereas an excessively long residence time may lead to degradation of the resins. Therefore, the residence time in the extruder is preferably from 1 to 30 minutes, and more preferably from 2 to 30 minutes.

In the melt-kneading in a single screw extruder, if the shear rate is excessively high, the particle diameter of the thermoplastic resin (a1) in the resulting adhesive resin composition (A) becomes excessively small, whereas if the shear rate is excessively low, the particle diameter of the thermoplastic resin (a1) in the resulting adhesive resin composition (A) becomes excessively large. Therefore, it is important to adjust the shear rate in the melt-kneading in a single screw extruder within a suitable range. Specifically, the linear velocity of a screw periphery in the single screw extruder is preferably from 0.8 to 8 m/min. Here, the linear velocity (m/min) of the screw periphery is a value which is calculated by multiplying the diameter of the screw by the circular constant and the rate of rotation, and which is correlated with the shear rate in the extruder. When the linear velocity of the screw periphery is less than 0.8 m/min, the dispersed particle diameter may become excessively large. The linear velocity is more preferably 1.2 m/min or more, and even more preferably 1.5 m/min or more. On the other hand, when the linear velocity of the screw periphery exceeds 8 m/min, the dispersed particle diameter may become excessively small. The linear velocity is more preferably 6 m/min or less, and even more preferably 4 m/min or less.

In the multilayer structure of the present invention, it is important that in the layer of the adhesive resin composition (A), particles of the thermoplastic resin (a1) are dispersed with an average particle diameter of from 0.1 to 1.2 μm in a matrix of the polyolefin (a2). Dispersion at such an average particle diameter makes it possible to obtain excellent interlayer adhesion. Here, the average particle diameter is an arithmetic average obtained by measuring the minor axes and the major axes of particles observed in a cross section of the multilayer structure produced by cutting it along the direction perpendicular to its extrusion direction (or injection direction) and averaging them. The observation area in the layer of the adhesive resin composition (A) is in the vicinity of the interface between the layer of the adhesive resin composition (A) and the layer of the resin (B).

When the average particle diameter is 0.1 μm or less, the interlayer adhesion strength decreases. The average particle diameter is preferably 0.12 μm or more, and more preferably 0.14 μm or more. The interlayer adhesion strength also decreases when the average particle diameter exceeds 1.2 μm. The average particle diameter is preferably 1 μm or less, and more preferably 0.8 μm or less. Thus, it has become clear that satisfactory interlayer adhesion strength can be obtained when the particle diameter is within a very limited range.

The multilayer structure of the present invention has a layer of the adhesive resin composition (A) and a layer of the resin (B). The resin (B) is not particularly restricted and examples thereof include resins such as polyolefins such as polyethylene (very low density, low density, middle density, high density), ethylene-vinyl acetate copolymers, EVOH, ethylene-acrylic acid ester copolymers, polypropylene, ethylene-propylene copolymers; products resulting from graft modification of the above described polyolefins with maleic anhydride, glycidyl methacrylate, or the like; semiaromatic polyesters such as poly (ethylene terephthalate) and poly (butylene terephthalate); aliphatic polyesters such as polyvalerolactone, polycaprolactone, poly (ethylene succinate) and poly (butylene succinate); aliphatic polyamides such as polycaprolactam, polylaurolactam, polyhexamethylene adipamide and polyhexamethylene azelamide; polyethers such as polyethylene glycol and polyphenylene ether; polycarbonate; styrene-based polymers such as polystyrene and styrene-acrylonitrile-butadiene copolymers; poly (methyl methacrylate); vinyl halide-based resins such as poly (vinyl chloride) and vinylidene fluoride; and the like. These resins may be used alone or alternatively may be used as a mixture of two or more of them. The resin (B) may be used as a mixture with scraps of the multilayer structure of the present invention unless the object of the present invention is affected.

Among the resins provided above as examples, EVOH (B1) is particularly preferable as the resin (B). The ethylene content of the EVOH (B1) is not particularly limited, but it is preferably from 3 to 70 mol %. When the ethylene content is less than 3 mol %, the melt stability may become insufficient. The ethylene content is more preferably 5 mol % or more, and even more preferably 20 mol % or more. On the other hand, when the ethylene content exceeds 70 mol %, the barrier property may become insufficient. The ethylene content is more preferably 60 mol % or less, and even more preferably 50 mol % or less. The saponification degree of the EVOH (B1) is usually from 10 to 100 mol %, preferably from 50 to 100 mol %, more preferably from 80 to 100 mol %, even more preferably from 95 to 100 mol %, and most preferably from 99 to 100 mol %. When the saponification degree is low, the degree of crystallinity of the EVOH (B1) may become insufficient or the thermal stability during melt-forming may become insufficient.

The EVOH (B1) can be prepared by a known method including copolymerizing ethylene and a vinyl ester using a radical initiator and then saponifying the resulting copolymer in the presence of an alkaline catalyst. Examples of the vinyl ester include vinyl acetate, vinyl propionate, vinyl pivalate, vinyl caprate, vinyl benzoate, and the like. Among such vinyl esters, only one ester may be used and two or more esters may also be used in combination. Among these, vinyl acetate is preferred.

Unless the object of the present invention is disturbed, copolymerization may be performed in the presence of other copolymerizable components. The other components include olefin-based monomers such as propylene, 1-butene and isobutene; acrylamide-based monomers such as acrylamide, N-methylacrylamide, N-ethylacrylamide and N,N-dimethylacrylamide; methacrylamide-based monomers such as methacrylamide, N-methylmethacrylamide, N-ethylacrylamide and N,N-dimethylmethacrylamide; vinyl ether-based monomers such as methyl vinyl ether, ethyl vinyl ether, n-propyl vinyl ether, isopropyl vinyl ether, tert-butyl vinyl ether and dodecyl vinyl ether; allyl alcohol; vinyltrimetoxysilane; N-vinyl-2-pyrrolidone; and the like.

The EVOH (B1) obtained in such a manner may be used alone or may be used in combination with another EVOH (B1) different in ethylene content, saponification degree, polymerization degree, or the like. Further, unless the object of the present invention is disturbed, it may be used with addition of thermoplastic resins other than the EVOH (B1). The content of the thermoplastic resins in the EVOH (B1) preferably falls within the range of from 0 to 50% by weight, more preferably within the range of from 0 to 40% by weight, and even more preferably within the range of from 0 to 10% by weight.

A preferable layer constitution of the multilayer structure is a constitution in which the layer of the EVOH (B1) and a layer of a hydrophobic thermoplastic resin are laminated to each other via the layer of the adhesive resin composition (A). This a composition which compensates drawbacks of EVOH (B1), namely, high moisture permeability and high expense. Examples of such hydrophobic thermoplastic resins include polyolefin (B2), styrene-based polymers, polyesters, and the like. A particularly preferable embodiment is one in which a layer of the ethylene-vinyl alcohol copolymer (B1) and a layer of a polyolefin (B2) are laminated to each other via the layer of the adhesive resin composition (A).

Preferable examples of the layer constituting the multilayer structure of the present invention include those shown below. Here, A, B1, B2, and Reg represent an adhesive resin composition, an EVOH, a hydrophobic thermoplastic resin typified by polyolefin, and a resin layer containing a scrap of a multilayer structure, respectively. The B2 may contain a plurality of layers. The thicknesses of the individual layers of the multilayer structure may optionally be selected. Such selection allows the total thickness of the multilayer structure to fall within a desired range.

2 layers: A/B1
3 layers: B1/A/B2
4 layers: B1/A/Reg/B2
5 layers: B2/A/B1/A/B2, B2/A/B1/A/Reg, B1/A/B2/Reg/B2
6 layers: B2/Reg/A/B1/A/B2
7 layers: B2/Reg/A/B1/A/Reg/B2

The multilayer structure obtained in such a manner is excellent in interlayer adhesion as being clear from the Examples shown infra. Even when it is recovered and reused, less appearance abnormalities, such as disturbance in a surface, gels and hard spots, will be generated. The multilayer structure can be subjected further to, for example, stretching operations such as uniaxially stretching, biaxial stretching and blow stretching, and thermoforming operations such as vacuum/pressure molding. It can also be fabricated into molded articles, such as films, sheets, bottles and cups, excellent in dynamic properties and gas barrier properties. The molded articles obtained are useful for applications where a gas barrier property is required such as materials for wrapping foods, materials for wrapping medical items (drugs and medical appliances) and fuel tanks.

EXAMPLE

The present invention will be described in more detail below by way of Examples, to which, however, the present invention is not limited at all. In the following description, a ratio means a weight ratio and "%" means "% by weight" unless otherwise stated. The average particle diameter of thermoplastic resin (a1) was measured by the following method.

Method of Average Particle Diameter Measurement

The structure of a layer of an adhesive resin composition (A) was observed by cutting a multilayer sheet along the direction perpendicular to the direction of extrusion, and photographing a cross section of the layer of the adhesive resin composition (A) at a magnification of 30,000 using a transmission electron microscope. A threshold value at which major particles could be recognized as particles and the background would not be continued in black was set and the photographed image was converted into binary (black-and-white) image. In the binary image, major axes and minor axes of all particles contained in a square area of $1.6\ \mu m \times 1.6\ \mu m$ containing the interface between the layer of the adhesive resin composition (A) and the layer of the EVOH (B1) as one side of the square were measured and the average of all the measurements was defined as the average particle diameter. In this measurement, dots as small as $0.0005\ \mu m$ or less, which could not be distinguished from the shade of the image, were omitted from the objects of the measurement.

Synthesis Example 1

Synthesis of Boronic Acid Ester Group-Containing SEBS (X-1)

A styrene-hydrogenated butadiene-styrene block copolymer (SEBS, styrene/hydrogenated butadiene=16/84 (weight ratio), hydrogenation percentage of butadiene units=94%, amount of double bonds=960 μeq/g, melt flow rate=5 g/10 min (at 230° C., under a load of 2160 g) was fed to a twin-screw extruder at a rate of 7 kg/hr while ventilating the feed port with 1 L/min nitrogen. Subsequently, while feeding a mixed solution of borane-triethylamine complex (TEAB) and boronic acid 1,3-butanediol ester (BBD) (TEAB/BBD=29/71 (weight ratio)) from a liquid feeder 1 at a rate of 0.6 kg/hr and 1,3-butanediol from a liquid feeder 2 at a rate of 0.4 kg/hr, melt-kneading was carried out continuously. During the kneading, the pressure was regulated so that the gauges at a vent 1 and a vent 2 indicated about 20 mmHg. As the result, SEBS (X-1) containing boronic acid 1,3-butanediol ester groups (BBDE) was obtained from the discharge port at a rate of 7 kg/hr. The SEBS contained boronic acid 1,3-butanediol ester groups in an amount of 650 μeq/g and double bonds in an amount of 115 µeq/g, and had a melt flow rate of 1.6 g/10 min (at 190° C., under a load of 2160 g).

The constitution and operating conditions of the twin-screw extruder used for the reaction are as follows:

Co-rotating twin-screw extruder TEM-35B (manufactured by Toshiba Machine Co., Ltd.)
Screw diameter: 37 mmφ
L/D: 52 (15 blocks)
Liquid feeder: C3 (Liquid feeder 1), C11 (Liquid feeder 2)
Vent position: C6 (Vent 1), C14 (Vent 2)
Constitution of screw: Seal rings were used between C5 and C6, between C10 and C11, and at C12.
Preset cylinder temperature: C1 (water cooling), C2-C3 (200° C.), C4-C15 (250° C.), die (250° C.)
Screw speed: 400 rpm Synthesis Example 2

Synthesis of Boronic Acid Ester Group-Containing SEBS (X-2)

SEBS (X-2) containing boronic acid 1,3-butanediol ester groups (BBDE) was synthesized in the same manner as in Synthesis Example 1, except for using a styrene-hydrogenated butadiene-styrene block copolymer (styrene/hydrogenated butadiene=16/84 (weight ratio), hydrogenation percentage of butadiene units=94%, amount of double bonds=960 µeq/g, melt flow rate=3 g/10 min (at 230° C., under a load of 2160 g). The SEBS (X-2) contained boronic acid 1,3-butanediol ester groups in an amount of 650 µeq/g and double bonds in an amount of 115 µeq/g, and had a melt flow rate of 0.6 g/10 min (at 190° C., under a load of 2160 g).

Example 1

Pellets of SEBS (X-1) obtained in Synthesis Example 1 and pellets of linear low-density polyethylene (LLDPE) "ULTZEX 2022L" produced by Mitsui Chemicals, Inc. (melt flow rate=2.1 g/10 min (at 190° C., under a load of 2160 g), density=0.919 g/cm$^3$) were dry-blended at a weight ratio of 4/96 by use of a tumbler, yielding a mixture of both pellets.

Next, high-density polyethylene (HDPE) "LF443" produced by Japan Polyethylene Corporation (melt flow rate=1.5 g/10 min (at 190° C., under a load of 2160 g), the pellet mixture, and EVOH "F171B" produced by Kuraray Co., Ltd. (ethylene content=32 mol %) were provided as raw materials and were introduced into separate extruders, respectively. Then, a 3-kind 5-layer multilayer sheet of HDPE/adhesive resin composition (A)/EVOH/adhesive resin composition (A)/HDPE was produced by coextrusion molding according to the conditions shown below. The thickness distribution of the resulting multilayer sheet was 50/10/10/10/50 µm.

The constitution and operating conditions of the coextrusion molding machine are as follows.

Extruder 1 [HDPE (B2)]:
Instrument: single screw extruder "GT-32-A type" produced by PLABOR Co., Ltd.
Screw diameter: 32 mmφ
Screw speed: 62 rpm
Preset cylinder temperature: 220° C.
Extruder 2 [adhesive resin composition (A)]:
Instrument: single screw extruder "P25-18AC" manufactured by Osaka Seiki Kosaku
Screw diameter: 25 mmφ
Screw constitution: fullflight
L/D: 18
Screw speed: 30 rpm
Linear velocity of screw periphery: 2.36 m/min
Preset cylinder temperature: 220° C.
Discharge rate: about 1 kg/hr
Residence time in extruder: about 9 min
Residence time in die: about 2 min
Extruder 3 [EVOH (B1)]:
Instrument: single screw extruder "Labo ME-type CO-NXT" produced by Toyo Seiki Seisaku-sho, Ltd.
Screw diameter: 20 mmφ
Screw speed: 18 rpm
Preset cylinder temperature: 220° C.
Die size: 300 mm
Sheet taking-off rate: 4 m/min
Temperature of cooling roll: 50° C.

The T-type peel strength in the interface between the adhesive resin composition (A) layer and the EVOH (B1) layer of the resulting multilayer sheet immediately after the sheet production was measured with an Autograph (tensile speed=250 mm/min) at 20° C. and 65% RH. The obtained value was defined as an interlayer adhesion. The interlayer adhesion was 1650 g/15 mm. Moreover, the structure of the adhesive resin composition (A) layer was observed by cutting the multilayer sheet along the direction perpendicular to the direction of extrusion, and photographing a cross section of the adhesive resin composition (A) layer at a magnification of 30,000 using a transmission electron microscope. In the adhesive resin composition (A) layer, particles of SEBS (X-1) were dispersed in a matrix of LLDPE. The measurement of the average particle diameter of the thermoplastic resin (a1) by the method previously described revealed that the average particle diameter was 0.2 µm.

Example 2

A multilayer structure was obtained in the same manner as in Example 1, except for using SEBS (X-2) obtained in Synthesis Example 2 instead of SEBS (X-1) in Example 1. The results evaluated in the same manner as in Example 1 are shown in Table 1.

Example 3

In Example 1, the rotation rate of the extruder 2 to which the adhesive resin composition (A) was introduced was increased to 1.6 times (48 rpm) and the linear velocity of the screw periphery was adjusted to 3.77 m/min. At this time, the rotation rates of the extruders 1 and 2 were also increased to 1.6 times, and the sheet taking-off rate was also increased to 1.6 times. A multilayer sheet having the same thickness as in Example 1 was obtained in the same manner as in Example 1 except for these points. The results evaluated in the same manner as in Example 1 are shown in Table 1.

Example 4

A multilayer sheet was obtained in the same manner as in Example 1 except for using low density polyethylene (LDPE) produced by Asahi Kasei Chemicals Corporation, "Suntec L2340" (melt flow rate 3.8 g/10 min measured at 190° C., under a load of 2160 g, and a density of 0.923 g/cm$^3$) instead of linear low density polyethylene (LLDPE) to be dry blended in Example 1. The results evaluated in the same manner as in Example 1 are shown in Table 1.

Example 5

A multilayer sheet was obtained in the same manner as in Example 1 except for using ethylene-vinyl acetate copolymer resin (EVAc) "EV360" (melt flowrate 2.0 g/10 min at 190° C., under a load of 2160 g, and a density of 0.950 g/cm$^3$) produced by Du Pont-Mitsui Polychemicals Co., Ltd., instead of linear low density polyethylene (LLDPE) to be dry blended in Example 1. The results evaluated in the same manner as in Example 1 are shown in Table 1.

Example 6

A multilayer sheet was obtained in the same manner as in Example 1 except for using polypropylene (PP) "EG7F" (melt flow rate 1.3 g/10 min at 190° C., under a load of 2160 g) produced by Japan Polypropylene Corporation instead of linear low density polyethylene (LLDPE) to be disposed as an outer layer of the multilayer sheet in Example 1. The results evaluated in the same manner as in Example 1 are shown in Table 1.

Example 7

A multilayer sheet was obtained in the same manner as in Example 1, except for changing the blending weight of SEBS (X-1) to linear low density polyethylene (LLDPE) in Example 1 to 2/98. The results evaluated in the same manner as in Example 1 are shown in Table 1.

Comparative Example 1

A multilayer sheet was obtained in the same manner as in Example 1, except for introducing pellets of a resin composition obtained by melt-kneading in a twin-screw extruder beforehand instead of introducing the mixture of the pellets into the extruder 2 in Example 1. The results evaluated in the same manner as in Example 1 are shown in Table 1. The construction and driving conditions of the twin-screw extruder used for the melt-kneading are as follows:

Co-rotating twin-screw extruder Labo Plastomil (manufactured by Toyo Seiki Seisaky-sho Co., Ltd.)
Screw construction: Co-rotation twin-screw
Screw diameter: 25 mmϕ
L/D: 25
Preset cylinder temperature: 220° C.
Screw speed: 150 rpm
Linear velocity of screw periphery: 11.78 m/min
Rate of feeding of resin: 5 kg/hr
Residence time: 2 minutes Comparative Example 2

A multilayer sheet was obtained in the same manner as in Example 1, except for changing the blending weight of SEBS (X-1) to linear low density polyethylene (LLDPE) to 0.5/99.5. The results evaluated in the same manner as in Example 1 are shown in Table 1.

Comparative Example 3

In Example 1, the rotation rate of the extruder 2 to which the adhesive resin composition (A) was increased to 3.73 times (112 rpm) and the linear velocity of the screw periphery was adjusted to 8.80 m/min. At this time, the rotation rate of the extruder 1 was increased to 1.87 times and the rotation rate of the extruder 2 was increased to 3.73 times. The sheet taking-off rate was increased to 3.73 times. A 3-kind, 5-layer multilayer sheet in which HDPE/adhesive resin composition (A)/EVOH/adhesive resin composition (A)/HDPE=25/10/10/10/25 μm was produced by coextrusion molding in the same manner as in Example 1 except for these points. The resulting multilayer sheet was evaluated in the same manner as in Example 1 and the results are shown in Table 1.

Comparative Example 4

In Example 1, the rotation rate of the extruder 2 to which the adhesive resin composition (A) was decreased to 0.33 times (10 rpm) and the linear velocity of the screw periphery was adjusted to 0.79 m/min. At this time, the rotation rates of the extruders 1 and 2 were also decreased to 0.33 times, and the sheet taking-off rate was also decreased to 0.33 times. A multilayer sheet having the same thickness as in Example 1 was obtained in the same manner as in Example 1 except for these points. The results evaluated in the same manner as in Example 1 are shown in Table 1.

Comparative Example 5

A multilayer sheet was obtained in the same manner as Comparative Example 1 except for using low density polyethylene (LDPE) "Suntec L2340" (melt flow rate 3.8 g/10 min at 190° C., under a load of 2160 g, and a density of 0.923 g/cm$^3$) produced by Asahi Kasei Chemicals Corporation instead of linear low density polyethylene (LLDPE) to be melt-kneaded in Comparative Example 1. The results evaluated in the same manner as in Example 1 are shown in Table 1.

Comparative Example 6

A multilayer sheet was obtained in the same manner as Comparative Example 1 except for using ethylene-vinyl acetate copolymer resin (EVAc) "EV360" (melt flow rate 2.0 g/10 min at 190° C., under a load of 2160 g, and a density of 0.950 g/cm$^3$) produced by Du Pont-Mitsui Polychemicals Co., Ltd., instead of linear low density polyethylene (LLDPE) to be melt-kneaded in Comparative Example 1. The results evaluated in the same manner as in Example 1 are shown in Table 1.

Comparative Example 7

A multilayer sheet was obtained in the same manner as in Comparative Example 1 except for using polypropylene (PP) "EG7F" (melt flow rate 1.3 g/10 min at 190° C., under a load of 2160 g) produced by Japan Polypropylene Corporation instead of linear low density polyethylene (LLDPE) to be disposed as an outer layer of the multilayer sheet in Comparative Example 1. The results evaluated in the same manner as in Example 1 are shown in Table 1.

Example 8

Pellets of SEBS (X-1) obtained in Synthesis Example 1 and pellets of low-density polyethylene (LDPE) "MIRASON 102" produced by Mitsui Chemicals, Inc. (melt flow rate 0.35 g/10 min at 190° C., under a load of 2160 g, and a density of 0.919 g/cm$^3$) were dry-blended at a weight ratio of 10/90 by use of a tumbler, yielding a mixture of both pellets.

A 3-kind, 5-layer multilayer direct blown bottle in which LDPE/adhesive resin composition (A)/EVOH/adhesive resin composition (A)/LDPE (average thickness at a body part of the direct blown bottle: 340/40/40/40/340 μm) was produced by using low density polyethylene (LDPE) "MIRASON 102" produced by Mitsui Chemicals, Inc. (melt flow rate 0.35 g/10 min at 190° C., under a load of 2160 g), the aforementioned pellet mixture, and EVOH "F171B" (ethylene content 32 mol %) produced by Kuraray Co., Ltd. as raw materials, and using a 4-kind, 7-layer blow molding machine "TB-ST-6P" manufactured by Suzuki Tekkosho Co. At this time, the extruder temperature for LDPE was 220° C. The extruder temperature of the adhesive resin composition (A) was 210° C. The extruder temperature for EVOH was 210° C. The resin temperature in the die was 220° C. The die temperature was 40° C. The average particle diameter as measured in the same manner as in Example 1 was 0.5 μm. Water was filled as content into the resulting direct blown bottle, which was then sealed tightly under normal pressure. Then, while the bottle was kept with its body horizontal, it was allowed to fall freely from a height of 50 cm to a 90°-angled edge of triangular pole having 20 cm in lengths so that the edge could hit the center of the bottle body. However, no interlayer delamination generated and it was confirmed that a performance meeting requirements can be obtained.

The constitution and driving conditions of the extruder used for molding are as follows:

Instrument: 4-kind, 7-layer direct blow molding machine manufactured by Suzuki Tekkosho Co.

Single screw extruder 1 (HDPE):
Screw diameter: 45 mmϕ,
Screw speed: 20 rpm
Preset cylinder temperature: 200° C.

Single screw extruder 2 (HDPE):
Screw diameter: 40 mmϕ,
Screw speed: 17 rpm
Preset cylinder temperature: 200° C.

Single screw extruder 3 (adhesive resin composition (A))
Screw diameter: 35 mmϕ
Screw constitution: fullflight
L/D: 23
Screw speed: 11 rpm
Preset cylinder temperature: 200° C.

Discharge rate: about 0.7 kg/hr
Residence time in extruder: about 10 min
Single screw extruder 4 (EVOH):
Screw diameter: 35 mmϕ
Screw speed: 5.3 rpm
Preset cylinder temperature: 210° C.

TABLE 1

| | Adhesive resin composition (A) | | | | | Linear | | | |
| | Thermoplastic resin (a1) | | Polyolefin (a2) | | Weight | | velocity of screw | | Average particle | Interlayer adhesion |
| | Kind | MFR (g/10 min) | Kind | MFR (g/10 min) | ratio (a1/a2) | Blending method | periphery (m/min) | Layer constitution[*2)] | diameter (μm) | strength (g/15 mm) |
|---|---|---|---|---|---|---|---|---|---|---|
| Example 1 | SEBS | 1.6 | LLDPE | 2.1 | 4/96 | Dry | 2.36 | A | 0.2 | 1650 |
| Example 2 | SEBS | 0.6 | LLDPE | 2.1 | 4/96 | Dry | 2.36 | A | 0.4 | 1400 |
| Example 3 | SEBS | 1.6 | LLDPE | 2.1 | 4/96 | Dry | 3.77 | A | 0.2 | 1600 |
| Example 4 | SEBS | 1.6 | LDPE | 3.8 | 4/96 | Dry | 2.36 | A | 0.2 | 1480 |
| Example 5 | SEBS | 1.6 | EVAc | 2 | 4/96 | Dry | 2.36 | A | 0.25 | 1700 |
| Example 6 | SEBS | 1.6 | LLDPE | 2.1 | 4/96 | Dry | 2.36 | C | 0.2 | 1620 |
| Example 7 | SEBS | 1.6 | LLDPE | 2.1 | 2/98 | Dry | 2.36 | A | 0.2 | 1530 |
| Comparative Example 1 | SEBS | 1.6 | LLDPE | 2.1 | 4/96 | Melt | 11.78/2.36[*1)] | A | 0.06 | 1200 |
| Comparative Example 2 | SEBS | 1.6 | LLDPE | 2.1 | 0.5/99.5 | Dry | 2.36 | A | 0.1 | 100 |
| Comparative Example 3 | SEBS | 1.6 | LLDPE | 2.1 | 4/96 | Dry | 8.8 | B | 0.05 | 900 |
| Comparative Example 4 | SEBS | 1.6 | LLDPE | 2.1 | 4/96 | Dry | 0.79 | A | 1.4 | 850 |
| Comparative Example 5 | SEBS | 1.6 | LDPE | 3.8 | 4/96 | Melt | 11.78/2.36[*1)] | A | 0.05 | 1050 |
| Comparative Example 6 | SEBS | 1.6 | EVAc | 2 | 4/96 | Melt | 11.78/2.36[*1)] | A | 0.04 | 1020 |
| Comparative Example 7 | SEBS | 1.6 | LLDPE | 2.1 | 4/96 | Melt | 11.78/2.36[*1)] | C | 0.05 | 1130 |

[*1)]Peripheral linear velocity in the pellet production/peripheral linear velocity in the molding
[*2)]A: HDPE/adhesive resin composition (A)/EVOH/adhesive resin composition (A)/HDPE = 50/10/10/10/50 (μm) B: HDPE/adhesive resin composition (A)/EVOH/adhesive resin composition (A)/HDPE = 25/10/10/10/25 (μm) C: PP/adhesive resin composition (A)/EVOH/adhesive resin composition (A)/PP = 50/10/10/10/50 (μm)

As is clear from Table 1, in Examples 1 to 7 where the average particle diameter of the thermoplastic resin (a1) is in the range of from 0.1 to 1.2 μm, satisfactory interlayer adhesion strengths have been obtained. Conversely, in Comparative Examples 1, 5, 6 and 7 where pellets of the adhesive resin composition (A) were produced by melt-kneading in a twin screw extruder beforehand, and then molding was conducted, the average particle diameter became less than 0.1 μm, resulting in greatly decreased interlayer adhesion strengths. Also in Comparative Example 3 where the linear velocity of the screw periphery of the extruder is high, the average particle diameter became less than 0.1 μm, resulting in greatly decreased interlayer adhesion strength. On the other hand, in Comparative Example 4 where the linear velocity of the screw periphery of the extruder is low, the average particle diameter became over 1.2 μm, also resulting in a greatly decreased interlayer adhesion strength. That is, the interlayer adhesion strength decreases greatly in both cases where the average particle diameter of the thermoplastic resin (a1) is excessively large or excessively small, and it therefore have become clear that the interlayer adhesion strength becomes satisfactory when the thermoplastic resin (a1) has a specific average particle diameter. The interlayer adhesion strength in Example 7 where the blending weight ratio (a1/a2) of the thermoplastic resin (a1) to the polyolefin (a2) is 2/98 is 1530 g/15 mm and it is slightly less than the interlayer adhesion strength (1650 g/15 mm) in Example 1 where the blending weight ratio (a1/a2) is 4/96. Conversely, in Comparative Example 2 where the blending weight ratio (a1/a2) is 0.5/

99.5, the interlayer adhesion strength is only 100 g/15 mm, and it is shown that the interlayer adhesion strength has decreased greatly. That is, it is shown that the interlayer adhesion strength changes sharply between a blending weight ratio (a1/a2) of 0.5/99.5 and that of 2/98 and the interlayer adhesion strength is increased by blending only a small amount of the thermoplastic resin (a1).

The invention claimed is:

1. A multilayer structure comprising a layer of an adhesive resin composition (A) and a layer of an ethylene-vinyl alcohol copolymer (B1), wherein the adhesive resin composition (A) comprises a thermoplastic resin (a1) containing functional groups of at least one selected from the group consisting of a boronic acid group and a boron-containing group capable of being converted into a boronic acid group in the presence of water, and a polyolefin (a2) which does not contain the functional groups, the blending weight ratio (a1/a2) of the thermoplastic resin (a1) to the polyolefin (a2) is 1/99 to 15/85, and particles of the thermoplastic resin (a1) are dispersed with an average particle diameter of 0.1 to 1.2 μm in a matrix of the polyolefin (a2).

2. The multilayer structure according to claim 1, wherein the melt flow rate, at 190° C. under a load of 2160 g, of the thermoplastic resin (a1) is from 0.7 to 4 g/10 min.

3. The multilayer structure according to claim 1, wherein the melt flow rate, at 190° C. under a load of 2160 g, of the polyolefin (a2) is from 0.1 to 10 g/10 min.

4. The multilayer structure according to claim 1, wherein a layer of the ethylene-vinyl alcohol copolymer (B1) and a layer of a polyolefin (B2) are laminated to each other via the layer of the adhesive resin composition (A).

5. A method for producing the multilayer structure according to claim 1, comprising providing a coextrusion molding machine equipped with a plurality of extruders, feeding pellets of the thermoplastic resin (a1) and pellets of the polyolefin (a2) to one extruder, feeding pellets of the resin (B) to another extruder, and performing coextrusion molding.

6. The method for producing a multilayer structure according to claim 5, wherein the pellets of the thermoplastic resin (a1) and the pellets of the polyolefin (a2) are dry blended in advance, and then fed to the extruder.

7. The method for producing a multilayer structure according to claim 5, wherein the extruder to which the pellets of the thermoplastic resin (a1) and the pellets of the polyolefin (a2) are fed is a single screw extruder.

8. The method for producing a multilayer structure according to claim 7, wherein the linear velocity of a screw periphery in the single screw extruder is from 0.8 to 8 m/min.

9. The method for producing a multilayer structure according to claim 6, wherein the extruder to which the pellets of the thermoplastic resin (a1) and the pellets of the polyolefin (a2) are fed is a single screw extruder.

10. The method for producing a multilayer structure according to claim 9, wherein the linear velocity of a screw periphery in the single screw extruder is from 0.8 to 8 m/min.

11. The multilayer structure according to claim 1, wherein the adhesive resin composition (A) consists of the thermoplastic resin (a1) and the polyolefin (a2).

12. The multilayer structure according to claim 1, wherein the boron-containing group is a functional group selected from the group consisting of a compound of formula (II), a compound of formula (III), and a compound of formula (IV):

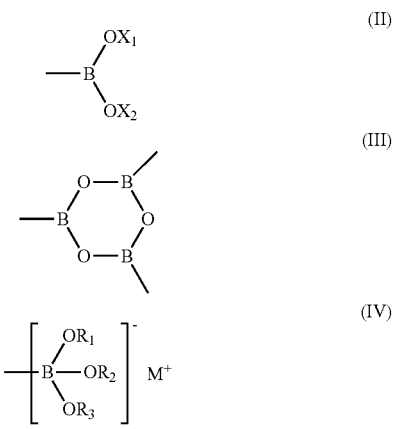

wherein $X_1$ and $X_2$ are the same or different and each represent a hydrogen atom, an aliphatic hydrocarbon group, an alicyclic hydrocarbon group, or an aromatic hydrocarbon group, where the aliphatic hydrocarbon group, the alicyclic hydrocarbon group and the aromatic hydrocarbon group may have a substituent, $X_1$ and $X_2$ may be combined together, provided that in no cases both $X_1$ and $X_2$ are hydrogen atoms;

$R_1$, $R_2$ and $R_3$ each represent a hydrogen atom, an aliphatic hydrocarbon group, an alicyclic hydrocarbon group or an aromatic hydrocarbon group, where the aliphatic hydrocarbon group, the alicyclic hydrocarbon group and the aromatic hydrocarbon group may have a substituent; and M represents alkali metal.

* * * * *

UNITED STATES PATENT AND TRADEMARK OFFICE
CERTIFICATE OF CORRECTION

| | | |
|---|---|---|
| PATENT NO. | : 8,211,541 B2 | Page 1 of 1 |
| APPLICATION NO. | : 12/094020 | |
| DATED | : July 3, 2012 | |
| INVENTOR(S) | : Tomonori Murata et al. | |

It is certified that error appears in the above-identified patent and that said Letters Patent is hereby corrected as shown below:

On Title Page, delete the text of item number (86) in its entirety and replace with the following:

--(86)    PCT No.:    PCT/JP2005/021140
        § 371 (c)(1),
        (2), (4) Date: May 16, 2008--

Signed and Sealed this

Thirteenth Day of November, 2012

David J. Kappos
*Director of the United States Patent and Trademark Office*